March 1, 1955     J. O. THIBAULT     2,703,103
COMBINED FILLER PLUG AND RELIEF VALVE
Filed Sept. 29, 1950     2 Sheets-Sheet 1
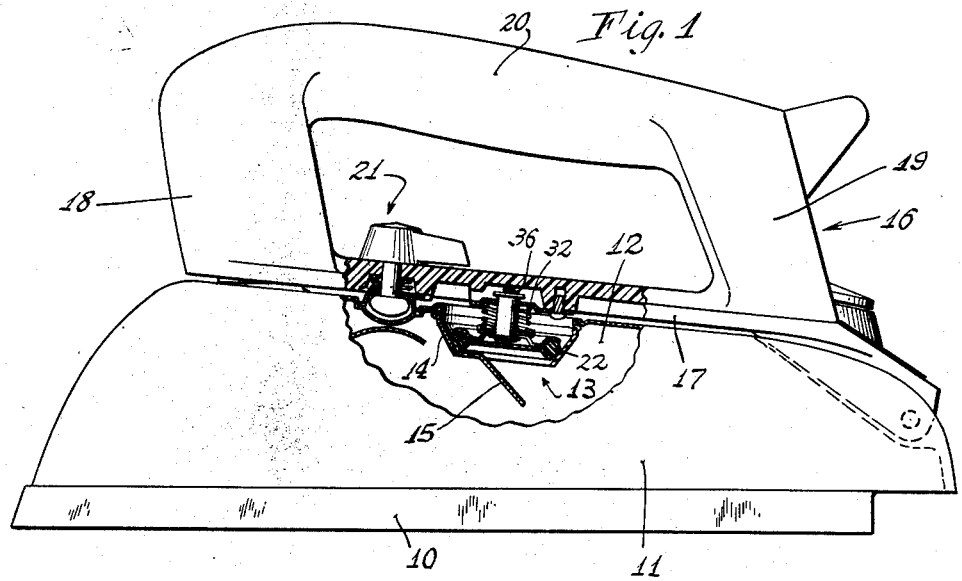
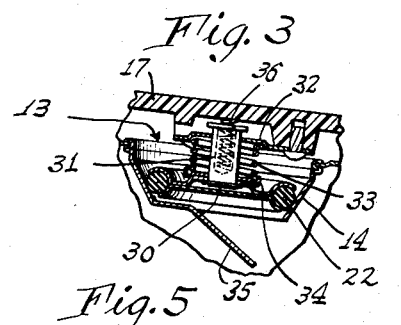
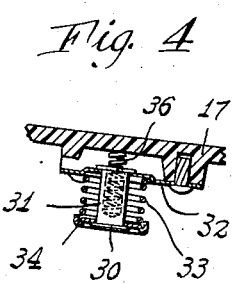
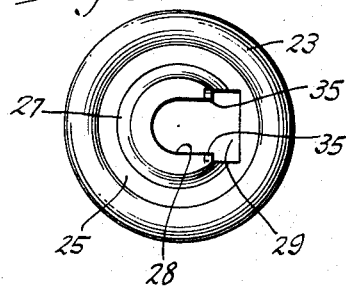
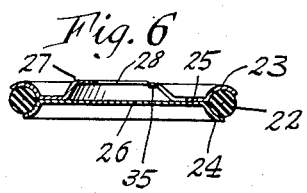
Inventor
Joseph O. Thibault
By
Johnson and Kline
Attorneys

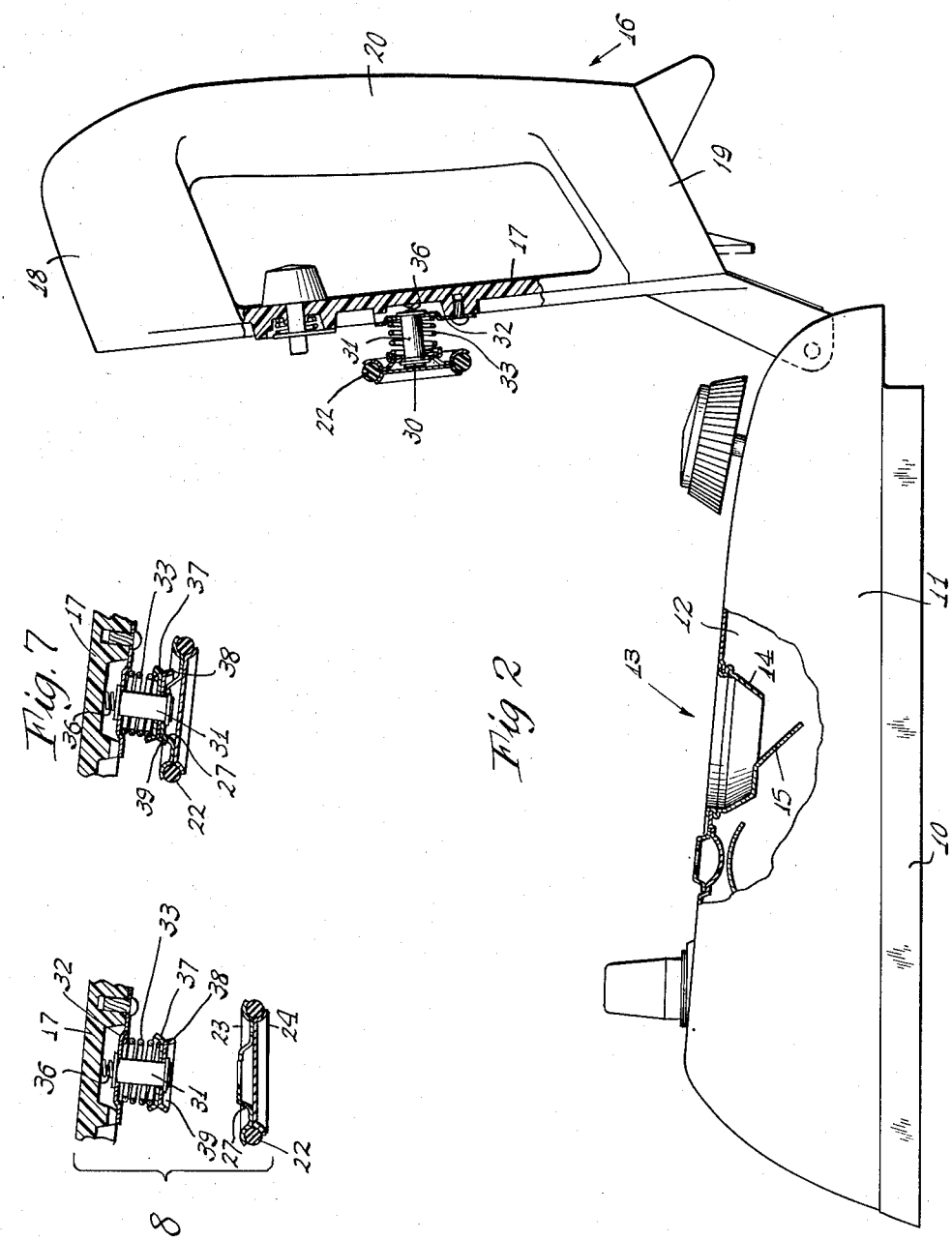

United States Patent Office 2,703,103
Patented Mar. 1, 1955

2,703,103

COMBINED FILLER PLUG AND RELIEF VALVE

Joseph O. Thibault, Bridgeport, Conn., assignor to Casco Products Corporation, Bridgeport, Conn., a corporation of Connecticut Application September 29, 1950, Serial No. 187,373

6 Claims. (Cl. 137—542)

This invention relates to steam-electric flatirons.

The present application is a continuation in part of my copending application Serial No. 103,437, filed July 7, 1949, entitled Steam Electric Flatiron for Domestic Housefold Use, now Patent No. 2,653,398 dated September 29, 1953.

An object of the invention is to provide an improved combined filler plug and safety valve for a steam-electric iron of the type having a hingedly-mounted handle structure carrying a filler plug or stopper, wherein the sealing part of the plug may be quickly and economically renewed or replaced.

A still further object of the invention is to provide an improved filler plug characterized as above, which is extremely simple in construction and economical to fabricate and produce.

A feature of the invention is a provision of a filler plug of the above type, which may be very easily and quickly dismantled for servicing or replacement of parts, if this should be necessary at any time.

In accomplishing the above objects I provide an iron structure comprising a sole plate and boiler assembly, to which is hingedly attached a handle structure. The boiler has a filler opening which is closed by a stopper structure on the handle when the latter is in operative position.

The stopper structure by which the filler opening of the boiler is closed, includes an inexpensive, quickly and easily removable and replaceable valve assembly consisting of two sheet metal disks and a sealing ring, the latter being formed of resilient rubber-like material and being mounted between the peripheral portions of the disks. This assembly is removably mounted on a yieldable support comprising a stud and spring provided on the underside of the handle structure, and is extremely economical to fabricate because of the few parts which it has.

Other features and advantages will hereinafter appear.

In the accompanying drawings:

Figure 1 is a side view of a flatiron, shown partly in section and partly in elevation, incorporating the improved filler plug or stopper of the present invention.

Fig. 2 is a view like Fig. 1, but showing the handle structure in raised position, with the stopper removed from the filler opening.

Fig. 3 is a detail in vertical section, showing the stopper means and the filler opening.

Fig. 4 is a detail in vertical section, showing the mounting stud and spring means carried thereby, on which the stopper or closure is mounted.

Fig. 5 is a plan view of the closure.

Fig. 6 is a diametric section of the closure.

Fig. 7 illustrates another embodiment of the invention, showing a closure or valve assembly and mounting means therefor in section, and Fig. 8 is a view like Fig. 7, but with the valve assembly removed from its mounting.

Referring to Figs. 1 and 2, the steam iron shown therein comprises a sole plate 10 having a casing 11 secured to its top, said casing including a boiler 12 having a filler opening 13 provided with conical, downwardly extending walls 14 terminating in a baffle or deflector 15 at their bottom edges.

Hingedly secured to the casing 11 is a handle structure 16 comprising a base 17, uprights 18 and 19 and a handle proper 20.

The handle structure 16 is releasably held in the operative position shown in Fig. 1 by a latch 21.

By the present invention an improved and simplified closure structure is provided for the filler opening 13 of the boiler 12, whereby an effective closing of said opening is accomplished when the handle unit 16 is in the operative position shown in Fig. 1, and whereby the valve proper when it wears out may be quickly and conveniently removed and replaced at a minimum of cost.

Referring to Figs. 1 through 6, this improved closure structure comprises a sealing ring or annulus 22 formed of resilient gasket material such as rubber or rubber-like substance, the said annulus being carried between the peripheral portions 23 and 24 of a pair of disks 25 and 26 which are secured together in broadside relation, as by spot welding. The peripheral portions 23 and 24 of the disks are in the form of flanges having partly circular cross sections, and the cross section of the sealing ring 22 is circular whereby a close fit is provided between these parts. The disk 25 has a raised central portion 27 provided with a slot 28 having an enlarged end 29 adapted to receive the head portion 30 of a stud 31 carried by a mounting plate 32 secured to the underside of the base portion 17 of the handle structure. The stud 31 carries a helical compression spring 33 and a flanged washer 34 which latter is engaged by said spring, the organization being such that the stud and washer are normally held in extended position, as shown in Fig. 4.

The valve assembly shown in Fig. 3, comprising the disks 25 and 26 and the sealing ring 22 may be mounted on the stud 31 by passing the head portion 30 of the stud through the large end 29 of the slot 28, and then shifting the valve structure edgewise until the stud 31 is centralized in the disk 25. Preferably tabs 35 are struck down adjacent the large end portion of the slot 28, thereby to engage the head portion 30 of the stud and prevent inadvertent dislodgement of the valve structure from the stud.

As shown in Fig. 1, when the handle unit 16 is in its operative position, the sealing ring 22 is made to engage the walls 14 in the filler opening 13 under pressure provided by the coil spring 33, resulting in the filler opening of the boiler being effectively closed. The stud 31 is preferably provided with a bore to accommodate a second coil spring 36 which engages the base portion 17 of the handle structure and prevents looseness of the stud 31 when the handle structure is in closed position.

By virtue of the valve structure comprising the ring 22 and disks 25 and 26 being yieldably held against the conical walls 14 of the filler opening by the compression spring 33, a safety valve action is obtained whereby excessive pressures in the boiler 12 will be relieved. When the steam pressure in the boiler 12 exceeds a certain predetermined value it will lift the valve assembly, compressing the spring 33 and enabling the steam to escape between the valve assembly and the walls 14 of the filler opening. Upon the steam pressure being relieved, the valve assembly will again fully seat itself in the filler opening 13, to completely close the latter.

The novel valve structure shown in Figs. 1 through 6 is of extremely simple construction, and the valve assembly shown in Fig. 3 is simple and economical to fabricate, and is readily removable and replaceable on the stud 31. The sealing ring 22 is formed from a minimum amount of material; if it should become worn out after an extended period of use, the element and the disks 25 and 26 carrying the same may be discarded and replaced by a new assembly at very little cost. An assembly totaling only three parts is discarded, the parts consisting of the sealing ring and the two disks which carry the ring. Since the cost of these parts is very little, the replacement cost of the valve assembly is relatively low.

Another embodiment of the invention is illustrated in Figs. 7 and 8. In this embodiment the valve assembly is carried by the mounting stud so as to be more securely held thereby against inadvertent removal. As shown, the stud 31 carries a pair of shallow, dished washers 37 and 38, disposed back-to-back, said washers replacing the single washer 34 shown in Figs. 1 through 6. The washer 37 serves to retain and position the coil spring 33, while the washer 38 has a depending flange 39 arranged to extend around the raised central portion 27 of the valve assembly. The flange 39 by virtue of its engagement with the raised portion 27 of the valve assembly tends to prevent edgewise movement of the latter, and accidental dislodgement thereof from the stud 31. However, when it is desired to remove the valve assembly from the stud, this may be readily done by first tilting the assembly out of its position normal to the stud, and thereafter shifting the assembly in an edgewise direction.

Variations and modifications may be made within the scope of the claims and portions of the improvements may be used without others.

I claim:

1. In a steam-electric iron, a valve for use with a filler opening to close the same, comprising a pair of disks secured together in broadside relation, said disks having spaced flanged peripheral portions of different outside diameters, forming walls of an annular groove, one of said walls being of greater radial dimension than the other and the disk which has the wall of lesser dimension being imperforate; and a ring of resilient sealing material disposed in said groove, said ring having outer surfaces which are exposed for engagement with the walls of said filler opening and which constitute a zone disposed asymmetrically of the central plane of the ring, the disk which has the groove-wall of greater radial dimension having an apertured central mounting portion spaced from the other disk.

2. As a new article of manufacture, a replaceable valve for use with a steam-electric iron, comprising a circular generally flat hollow body formed of a pair of disks secured broadside to each other, one disk having a slot with an enlarged end whereby the head portion of a supporting stud may be inserted and retained in the body; and a sealing ring carried by the disks at the peripheries thereof, to provide sealing engagement between the body and the walls of a filler opening, said peripheries being flanged to provide an annular groove for receiving said ring.

3. As a new article of manufacture, a replaceable valve for use with a steam-electric iron, comprising a pair of disks secured together in broadside relation, said disks being shaped to provide an enclosed space between them and one of said disks having a slot with an enlarged end whereby the head portion of a supporting stud may be inserted in said slot to occupy part of said enclosed space; and sealing means carried by the disks between the peripheral portions thereof to provide for sealing engagement between the disks and the walls of a filler opening.

4. As a new article of manufacture, a replaceable valve for use with a steam-electric iron, comprising a pair of disks secured together in broadside relation, said disks being shaped to provide an enclosed space between them and one of said disks having a slot with an enlarged end whereby the head portion of a supporting stud may be inserted in said slot to occupy part of said enclosed space; flanges on the peripheral portions of the disks, forming walls of an annular groove; and a ring of resilient sealing material carried in said groove to provide sealing engagement between the disks and the walls of a filler opening.

5. In a steam-electric iron, a valve mechanism for use with a filler opening to close the same, comprising a circular generally flat hollow body formed of a pair of disks secured broadside to each other, one disk having a slot with an enlarged end; a stud for removably supporting said body, having a head portion adapted to be inserted in said slot and retained within the body, or removed therefrom to release the body; sealing means carried by the body at the peripheries of the disks thereof, to provide sealing engagement between the body and walls of the filler opening; and yieldable means carried by said stud, engaging the body to continuously urge the latter to an extended position on the stud.

6. The invention as defined in claim 3, in which the slotted disk has inturned tabs adjacent the enlarged end of the slot, to engage and retain the head portion of the supporting stud in said slot.

References Cited in the file of this patent

UNITED STATES PATENTS

| Number | Name | Date |
|---|---|---|
| 767,118 | Popham et al. | Aug. 9, 1904 |
| 1,485,508 | Kiley | Mar. 4, 1924 |
| 2,008,101 | Haury | July 16, 1935 |
| 2,088,509 | Fitzgerald | July 27, 1937 |
| 2,192,425 | Allen et al. | Mar. 5, 1940 |
| 2,283,772 | Stone | May 19, 1942 |
| 2,300,815 | Sharp | Nov. 3, 1942 |
| 2,475,572 | Schreyer | July 5, 1949 |